(No Model.) 2 Sheets—Sheet 1.
B. J. SYKES.
MOWING MACHINE.
No. 512,130. Patented Jan. 2, 1894.
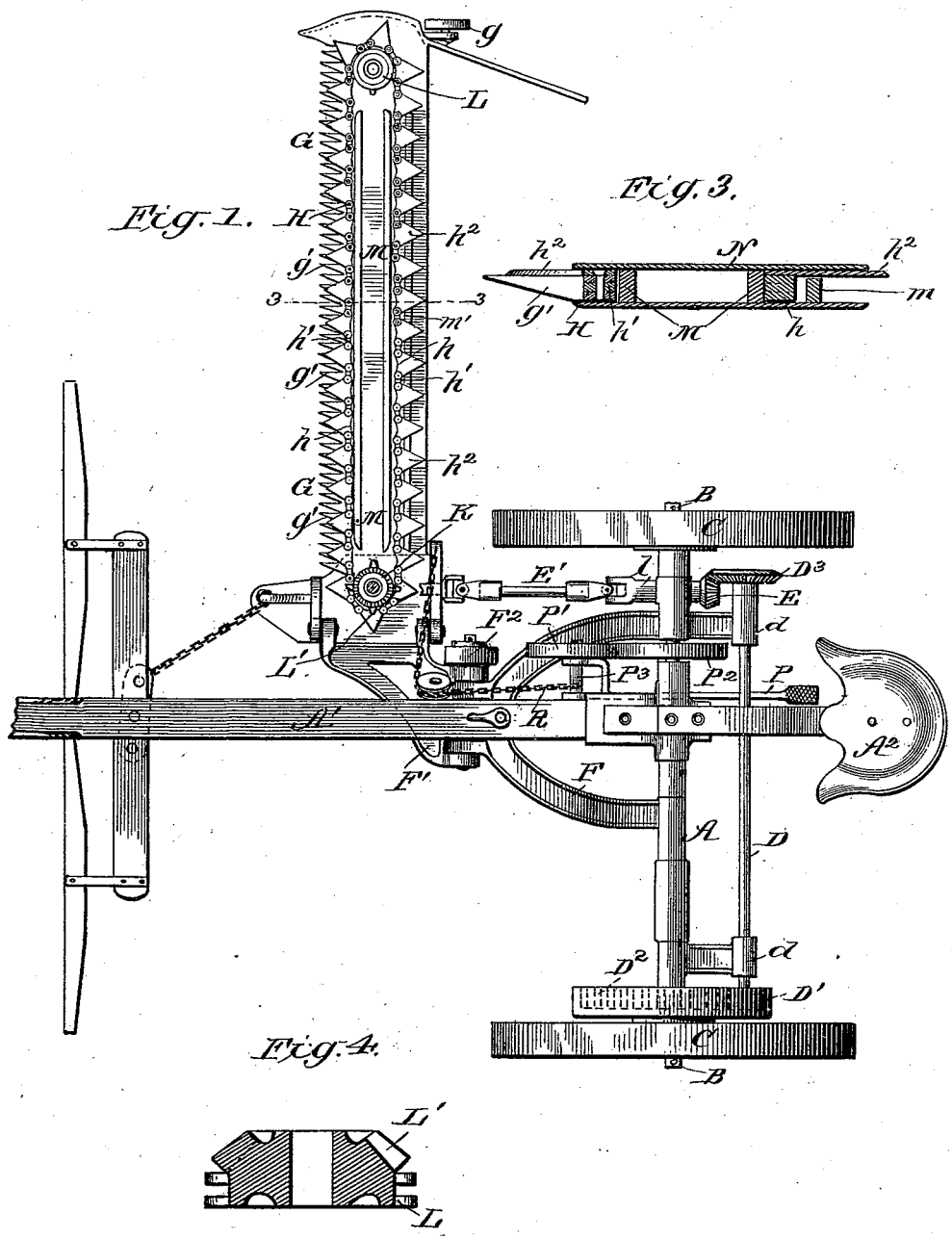
WITNESSES:
Fred G. Dieterich
Jos. A. Ryan
INVENTOR:
Benjamin J. Sykes
BY Munn & Co.
ATTORNEYS (No Model.) 2 Sheets—Sheet 2.
B. J. SYKES.
MOWING MACHINE.
No. 512,130. Patented Jan. 2, 1894.
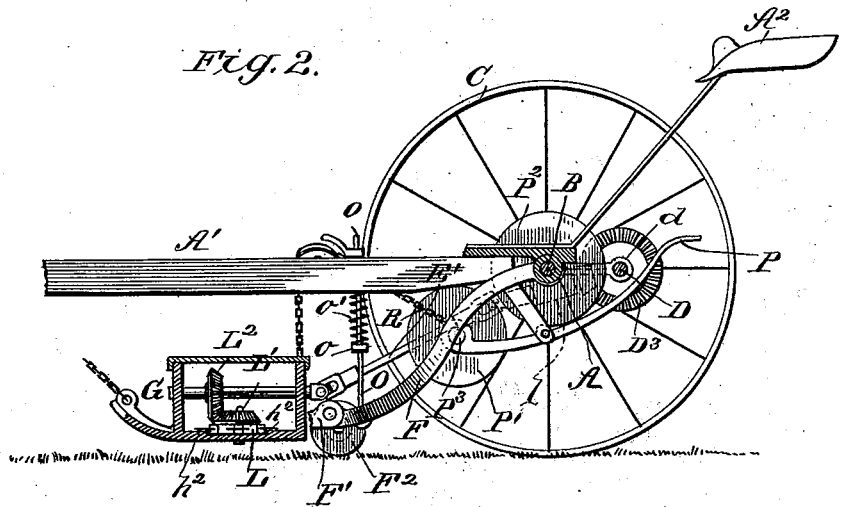
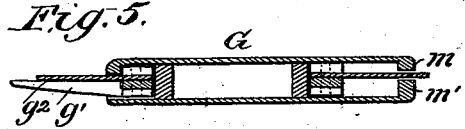
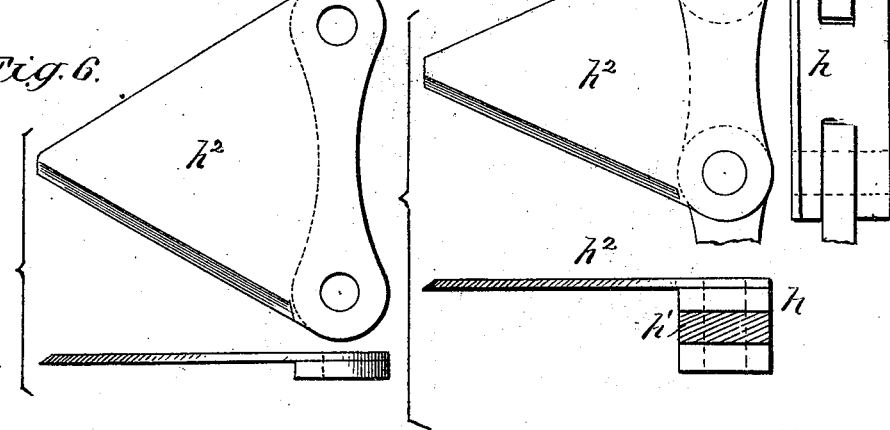
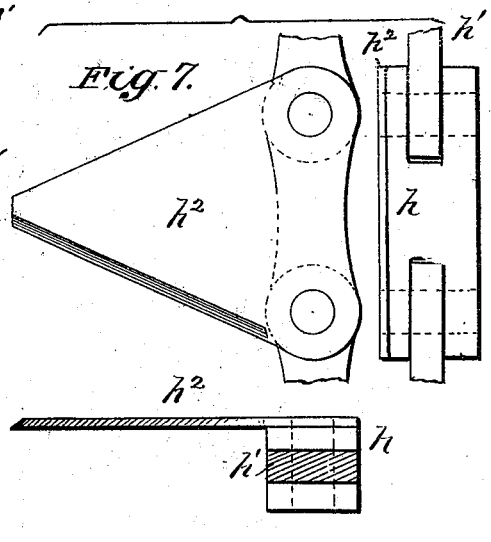
WITNESSES:
Fred G. Dieterich
Jos. A. Ryan
INVENTOR:
Benjamin J. Sykes.
BY Munn & Co
ATTORNEYS

UNITED STATES PATENT OFFICE.

BENJAMIN J. SYKES, OF SYKESVILLE, PENNSYLVANIA.

MOWING-MACHINE.

SPECIFICATION forming part of Letters Patent No. 512,130, dated January 2, 1894.

Application filed June 14, 1892. Serial No. 436,753. (No model.)

*To all whom it may concern:*

Be it known that I, BENJAMIN J. SYKES, residing at Sykesville, Jefferson county, in the State of Pennsylvania, have invented a new and useful Improvement in Mowing-Machines, of which the following is a specification.

This invention relates generally to mowing machines and particularly to that class thereof known as endless knife machines.

The object of my invention is to provide certain improvements in this class of machines, whereby the cutting apparatus will normally be held down upon the ground, but allowed to rise when an obstruction is encountered and immediately thrown down again when said obstruction has been passed.

With this object in view my invention consists in the peculiar construction of the several parts and their novel combination or arrangement, all of which will be fully set forth hereinafter and designated in the claim.

In the drawings forming a part of this specification Figure 1 is a top plan view of my improved mower. Fig. 2 is a side view partly in section. Fig. 3 is a transverse section on line 3—3 of Fig. 1. Fig. 4 is a detail view of the combined sprocket and gear wheel. Fig. 5 shows a construction differing somewhat from Fig. 3, and Figs. 6 and 7 show details of construction hereinafter referred to.

Referring to the drawings, A indicates an axle sleeve within which is arranged the axle B having the supporting wheels C C, mounted upon its opposite ends. The tongue A' is also connected with the sleeve A, and to this tongue is attached the spring seat A$^2$.

D indicates a cross shaft journaled to the rear of the axle in bearings $d$ attached to the sleeve A, and upon one end of the shaft D is arranged a pinion D', which meshes with an internally toothed wheel D$^2$, mounted upon the axle. Upon the opposite end of the shaft D is mounted a gear D$^3$, which meshes with a gear E, mounted upon the rear end of a jointed tumbler rod E'. The rear section of the rod E' is journaled in a bearing $l$ formed upon the under side of the sleeve A. A forwardly and downwardly projecting yoke frame F is arranged upon the axle B, said frame having a bracket F' hinged at its lower end, and upon the pintle of said hinge is arranged a caster roller F$^2$, which supports the yoke frame upon the ground. The finger bar G is hinged to the side of the bracket F' and upon its outer end is mounted a roller $g$. The finger bar G has the usual guard fingers $g'$ and upon this bar is mounted the endless cutter knife H, composed of the links $h$ and $h'$, and the blades $h^2$. The endless cutter is passed around and driven by the sprocket wheels K and L, the sprocket L being arranged at the inner end of the bar and formed integrally with a gear L', which meshes with a gear L$^2$, mounted upon the forward end of the tumbler rod, the forward section of the said rod, being journaled in a casing produced upon the inner end of finger bar and within which the combined sprocket and gear is arranged. It will also be noticed that the gear L$^2$ is arranged upon the forward side of the combined gear and sprocket, thus applying the power directly to the forward range of the belt which makes it more efficient in severing the grass.

In order to keep the cutter belt in its proper position at all times, I provide a guide frame M, upon the cutter bar around which the chain moves and also provide a cover N, which protects the cutter from the grass and also serves to guide the same, said cover being projected beyond the guide frame and provided with depending flanges $m$, which in connection with the flange $m'$ upon the bottom of bar and the guard fingers keep the belt in proper position, the links resting against the guide frame, and the blades passing between the flanges. I prefer to connect the blade to the slotted link, as shown in Fig. 7, in which case I dispense with the guide frame and cover substantially as above described, and provide a guiding frame and cover similar to that shown in Fig. 3. The casing at the inner end of cutter bar is provided with a cover which protects the driving gear from the grass.

O indicates a hanger bolt connecting the lower end of yoke with the tongue or beam and holding said yoke in its normal position. The bolt O is provided with a collar $o$ and between this collar and beam is arranged a coiled spring $o'$ which permits the yoke to yield vertically to obstructions and returns it to its normal position.

In order to lift the finger bar, I provide a foot lever P pivoted beneath the tongue and extending forward beneath the axle said lever carrying a friction wheel $P'$, which engages a power wheel $P^2$ mounted upon the axle. The friction wheel $P'$ is mounted upon the end of a shaft $P^3$ carried at the forward end of the lever P and upon the shaft is wound a chain R, which connects with the finger bar and by pressing upon the foot lever the friction wheel $P'$ contacts with the wheel $P^2$, the shaft revolves and the finger bar is elevated.

In operation as the machine is drawn forward by the tongue, the cross shaft is revolved driving the tumbler rod which communicates its power to the forward side of the chain thus keeping the chain taut on its forward range and making it more effective in severing the blades.

By means of the bracket between the finger bar and yoke frame said bar can have an upward and inward movement.

By means of the rollers arranged as described all strain is taken from the various parts, and the hanger bolt having a spring thereon has been found very advantageous in operating upon rough ground.

The endless knife is safely guided and protected from grass at all times. The driving gear attached to the inner end of finger bar is also protected.

The chain is exceedingly simple and very strong. The foot lever is also a great advantage, as it frequently becomes necessary to elevate the finger bar in order to avoid stumps, rocks, &c., and at said times it is necessary to have complete control over the draft team.

In case a hand lever is used one hand must be employed to operate it—whereas, in my construction both hands may be used to handle the team, and the finger bar operated by the foot.

Having thus described my invention, what I claim, and desire to secure by Letters Patent, is—

In a mower, the combination with a beam and supporting frame, of a yoke depending from the frame, a bracket pivotally connected to said yoke, a cutter bar connected to the said frame, and a bar secured to the depending yoke, and passing through beam, said bar having a collar formed thereon, and a spring coiled about said bar between the collar and beam whereby the yoke is normally held down, and the cutter maintained upon the ground.

BENJAMIN J. SYKES.

Witnesses:
SOLON C. KEMON,
CHAS. E. BROCK.